US009606354B2

(12) United States Patent
Spitzer et al.

(10) Patent No.: US 9,606,354 B2
(45) Date of Patent: *Mar. 28, 2017

(54) HEADS-UP DISPLAY WITH INTEGRATED DISPLAY AND IMAGING SYSTEM

(71) Applicant: Google Inc., Mountain View, CA (US)

(72) Inventors: Mark B. Spitzer, Sharon, MA (US); John D. Perreault, Mountain View, CA (US); Khoa Nguyen, Fremont, CA (US)

(73) Assignee: Google Inc., Mountain View, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/333,648

(22) Filed: Jul. 17, 2014

(65) Prior Publication Data

US 2016/0018639 A1    Jan. 21, 2016

(51) Int. Cl.
*G02B 27/01* (2006.01)
*G02B 27/28* (2006.01)
*G02B 5/30* (2006.01)
*G06F 3/01* (2006.01)

(52) U.S. Cl.
CPC ........... *G02B 27/0101* (2013.01); *G02B 5/30* (2013.01); *G02B 5/3083* (2013.01); *G02B 27/0103* (2013.01); *G02B 27/0172* (2013.01); *G02B 27/283* (2013.01); *G06F 3/013* (2013.01); *G02B 2027/0107* (2013.01); *G02B 2027/0138* (2013.01); *G02B 2027/0178* (2013.01); *G02B 2027/0187* (2013.01)

(58) Field of Classification Search
CPC .............................................. G02B 2027/0138

USPC ........................................................ 345/5–9
See application file for complete search history.

(56) References Cited

U.S. PATENT DOCUMENTS

| 5,394,259 | A | * | 2/1995 | Takahara | ............... | H04B 10/11 |
|           |   |   |        |          |                | 398/108 |
| 5,886,822 | A | * | 3/1999 | Spitzer  | ............... | G02B 27/0172 |
|           |   |   |        |          |                | 359/630 |
| 6,384,982 | B1 |  | 5/2002 | Spitzer  |                |  |
| 8,360,578 | B2 |  | 1/2013 | Nummela  |                |  |
| 8,382,285 | B2 |  | 2/2013 | Eberl et al. |            |  |
| 9,001,030 | B2 | * | 4/2015 | Raffle   | ................... | G02B 27/00 |
|           |   |   |        |          |                | 345/156 |
| 2001/0055152 | A1 | * | 12/2001 | Richards | ............ | G02B 27/0093 |
|           |   |   |        |          |                | 359/462 |

(Continued)

FOREIGN PATENT DOCUMENTS

WO    WO 2013-167864 A1    11/2013

*Primary Examiner* — Carolyn R Edwards
(74) *Attorney, Agent, or Firm* — Blakely Sokoloff Taylor & Zafman LLP

(57) ABSTRACT

Embodiments of an apparatus comprising a light guide including a proximal end, a distal end, a display positioned near the proximal end, an ocular measurement camera positioned at or near the proximal end to image ocular measurement radiation, a proximal optical element positioned in the light guide near the proximal end and a distal optical element positioned in the light guide near the distal end. The proximal optical element is optically coupled to the display, the ocular measurement camera and the distal optical element and the distal optical element is optically coupled to the proximal optical element, the ambient input region and an input/output optical element. Other embodiments are disclosed and claimed.

30 Claims, 11 Drawing Sheets

(56) References Cited

U.S. PATENT DOCUMENTS

| | | | |
|---|---|---|---|
| 2013/0021658 A1* | 1/2013 | Miao | G02B 27/283 359/256 |
| 2013/0044130 A1* | 2/2013 | Geisner | G09G 5/00 345/633 |
| 2014/0140654 A1 | 5/2014 | Brown et al. | |

* cited by examiner

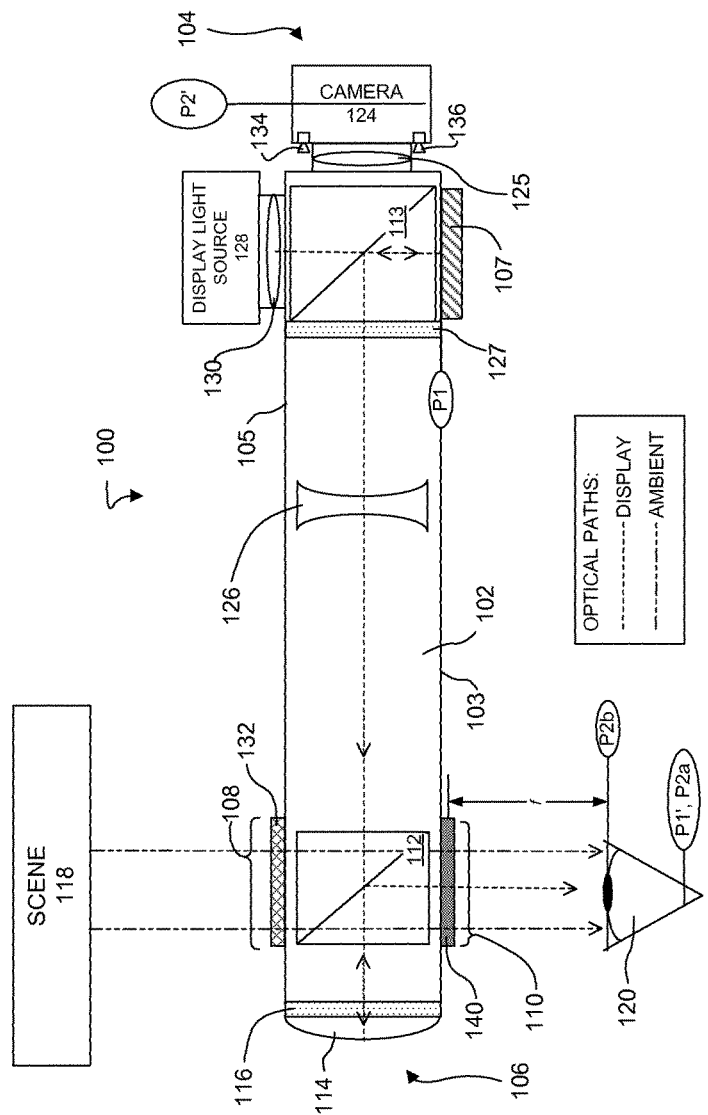

HEADS-UP DISPLAY WITH INTEGRATED DISPLAY AND IMAGING SYSTEM

TECHNICAL FIELD

The application discloses embodiments of head-ups displays and in particular, but not exclusively, relates to heads-up displays including integrated display and an imaging system for ocular measurement.

BACKGROUND

Heads-up displays allow a user to view a scene while relevant information is overlaid on the scene, so that the user looking through the heads-up display simultaneously sees both the scene and the relevant information. For example, a pilot looking through a heads-up display while landing an airplane simultaneously sees the airport ahead (the scene) through the heads-up display while the heads-up display projects information such as speed, heading and altitude (the relevant information) that the pilot needs to land the plane.

In some uses of a heads-up display it can be useful to know what the user is viewing. One way to accomplish this is through ocular measurement technology, but existing technologies have some disadvantages. Among other things, existing ocular measurement technologies use an optical path separate from the optical path used for the display, making the heads-up display more bulky and complex and less streamlined.

BRIEF DESCRIPTION OF THE DRAWINGS

Non-limiting and non-exhaustive embodiments are described below with reference to the following figures. Like reference numerals refer to like parts in the different figures unless otherwise specified.

FIGS. 1A-1B are cross-sectional views of an embodiment of a heads-up display illustrating its construction (FIGS. 1A-1B), its display and ambient light paths (FIG. 1A) and its ocular measurement radiation path (FIG. 1B).

DETAILED DESCRIPTION OF ILLUSTRATED EMBODIMENTS

Embodiments are described of an apparatus, system and method for heads-up displays including integrated display and an imaging system for ocular measurement. Specific details are described to provide a thorough understanding of the embodiments, but a person skilled in the relevant art will recognize that the invention can be practiced without one or more of the described details or with other methods, components, materials, etc. In some instances well-known structures, materials, or operations are not shown or described in detail but are nonetheless encompassed within the scope of the invention.

Reference throughout this specification to "one embodiment" or "an embodiment" means that a described feature, structure, or characteristic can be included one or more described embodiments, meaning that appearances of "in one embodiment" or "in an embodiment" do not necessarily all refer to the same embodiment. Furthermore, the described features, structures, or characteristics can be combined in any suitable manner in one or more embodiments.

Figure 1B:
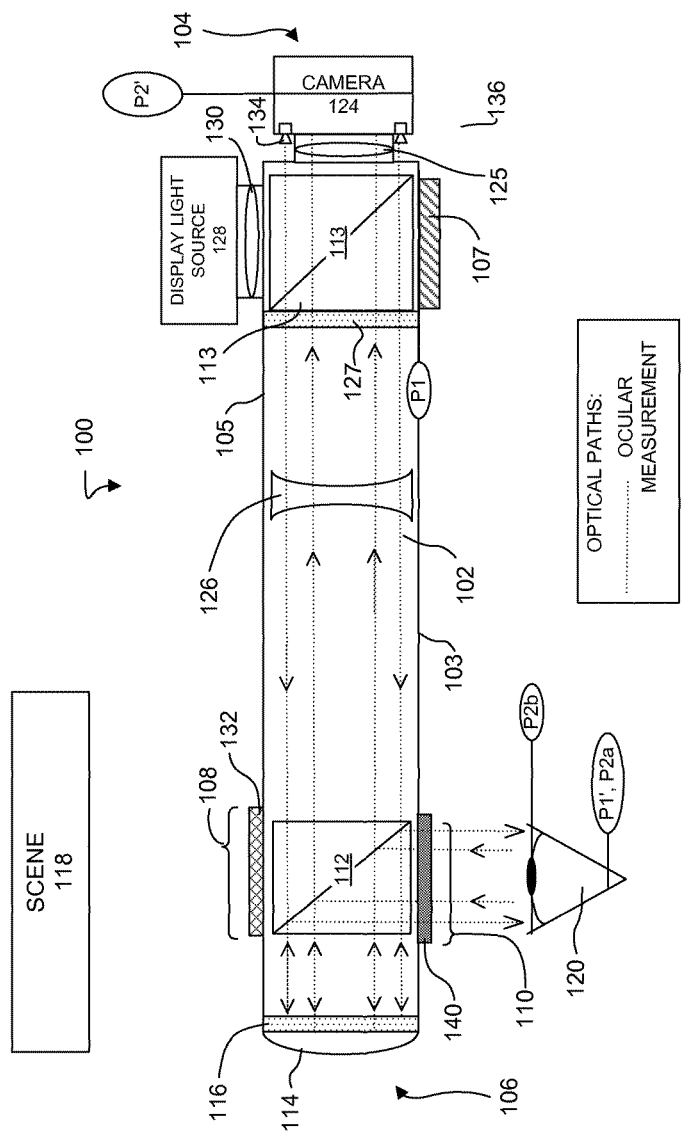

FIGS. 1A-1B illustrate an embodiment of a heads-up display 100. Display 100 includes a light guide 102 having a back surface 103, a front surface 105, a proximal end 104 and a distal end 106. Light guide 102 can be made of any kind of material that is substantially transparent in the wavelengths of interest; in one embodiment, for example, light guide 102 can be made of a plastic material such as polycarbonate or optical-grade acrylic, but in other embodiments it could be made of a different material such as glass. Near distal end 106 are an ambient input region 108 positioned on front surface 105 to receive ambient light from a scene 118 and an input/output region 110 positioned on back surface 103 to receive input ocular measurement radiation and output both display light and ambient light to an eye 120 of a user. The pupil of eye 120 is at a distance f from the input/output optical element 140. In different embodiments distance f can be in the range of 15 to 30 mm.

A display 107 is positioned on back surface 103 near proximal end 104. The display is optically coupled to light guide 102 so that display light from display 107 is input into light guide 102. In one embodiment display 107 is a reflective liquid-crystal-on-silicon (LCOS) display, but in other embodiments other kinds of displays can be used (see FIGS. 1C-1D). Display 107 can be optically coupled to a display light source 128. In one embodiment, display light source 128 is an LED source that emits only light in the visible portion of the spectrum, such as white light or red, green, and blue (RGB) light. In other embodiments light source 128 can be some other type of source, such as one or more lasers in one embodiment, and can emit in other wavelength ranges, provided the wavelength range of display light source 128 does not overlap with the wavelength of the ocular measurement radiation. Display light source 128 can also include an optical element 130 to help condition the emitted light, for example by collimating or focusing. Display light source 128 illuminates LCOS display 107, and LCOS display 107 reflects the incident light and modulates an image onto it. The light reflected from LCOS 107 is referred to as the display light.

A camera 124 is coupled to light guide 102 at or near distal end 104 to receive and image ocular measurement radiation directed to it through light guide 102 (see FIG. 1B). Camera 124 can image the pupil, iris, or retina of eye 120. The wavelength of the ocular measurement radiation should not be one of the wavelengths used by display light source 128. In one embodiment, the ocular measurement radiation can be infrared; for example, in an embodiment where display light source 128 uses RGB LEDs emitting in the range Red (630-660 nm), Green (530-560 nm), and blue (470 to 520 nm), then the ocular measurement radiation could be 600 nm. In one embodiment camera 124 can be a camera with an image sensor such as a CMOS or CCD image sensor. If the ocular measurement wavelength is infrared, the CMOS sensor can be configured without the red, green, and blue color filters normally used to generate a color image. In the illustrated embodiment, camera 124 is optically coupled to light guide 102 by an optical element 125. In one embodiment optical element 125 can be a refractive lens, but in other embodiments it can be a reflective or diffractive optical element, or a combination of refractive, diffractive, and reflective optical elements. In other embodiments camera 124 can be directly coupled to light guide 102 without an intervening optical element such as optical element 125. In still other embodiments, the display and camera can be combined into a single device to reduce complexity. For example, a bi-direction OLED architecture could interleave detector/emitter elements, along with a lens array to image the iris plane of eye 120.

Positioned in light guide 102 at or near proximal end 104 is a proximal optical element 113 that is optically coupled to camera 124, display 107, and distal optical element 112. Proximal optical element 113 operates to transmit light from display light source 128 to display 107 and from display 107 through light guide 102 toward distal end 106. Proximal optical element 113 also operates to direct ocular measurement radiation received through light guide 102 from distal end 106 toward camera 124 and, if present, optical element 125. In the illustrated embodiment proximal optical element 113 is a polarizing beam splitter (PBS), but in other embodiments optical element 113 can be a different element (see, e.g., FIGS. 2-3). In some embodiments additional components such as internal optical element 126 and half-wave plate 127 can be positioned between proximal optical element 113 and distal optical element 112.

Distal optical element 112 is positioned at or near distal end 106 and is optically coupled to proximal optical element 113, ambient input region 108, input/output region 110, and input/output optical element 140. Distal optical element 112 is also coupled to optical elements 114 and 116, which are positioned on the distal end of light guide 102. In the illustrated embodiment distal optical element 112 is a polarizing beamsplitter, optical element 114 is a focusing mirror, and optical element 116 is a quarter-wave plate sandwiched between optical element 114 and the distal end of light guide 102. In other embodiments optical elements 112, 114, and 116 can be other types of optical elements, provided that the individual elements and their combination accomplish the desired result. For example, in other embodiments distal optical element 112 can be a 50/50 (50% pass, 50% reflect) non-polarizing beam splitter (see FIG. 2), in which case quarter-wave plate 116 can be omitted, or can be other elements such as a plurality of semi-transparent reflectors. In still other embodiments optical elements 112 and 113 can also be holographic optical elements (HOEs).

Input/output optical element 140 is positioned over and optically coupled to input/output region 110 to condition ocular measurement radiation traveling to or from eye 120. Optical element 140 can have optical power at all wavelengths or can have optical power only at a selected wavelength or over a selected range of wavelengths. The optical power of optical element 140 can be selected, when acting with other optical components such as mirror 114, to form an image of the pupil, retina, sclera, or other part of eye 120 on the image sensor of camera 124. In one embodiment input/output optical element 140 is a holographic optical element (HOE) designed to operate as a positive focal-length lens only over the wavelength range of the ocular measurement radiation, and to have substantially no optical power at other wavelengths (HOE 140 might still have some minimal optical power at other wavelengths, but the diffraction efficiency will be negligible so the HOE will appear transparent). For instance, if the ocular measurement radiation has a wavelength of about 700 nm, the HOE can designed to operate only at 700 nm. At 700 nm the HOE will operate as an imaging lens, but will not affect light at visible wavelengths and will thus appear transparent to the user.

The ocular measurement needs to function well for various users who may place the eyewear at different distances from the eye. Input/output optical element can be used to adjust the optical power of the system to have a depth of field consistent with the image sensor resolution over the eye relief range 80 of 15 mm to 30 mm, so that the ocular measurement is insensitive to the distance of the user's pupil over a reasonable range. In an embodiment in which input/output optical element 140 is an HOE, this can be accommodated by using a plurality of infrared ocular measurement radiation sources such as LEDs 134 or 136 (see below) with different center wavelengths. The HOE focal length will vary slightly with wavelength; thus, by illuminating the LEDs sequentially, one can select the LED corresponding to focal length that provides the best image sharpness. Alternatively, input/output optical element 140 can be a hologram system formed to accommodate various eye positions f by creating a stack of infrared holograms, each hologram tuned to a different wavelength and focal length. By selecting the LED with a specific wavelength range, one can select the focal length that provides the image sharpness. Logic and pattern recognition can be used to determine automatically which LED provides the sharpest focus.

A filter 132 can optionally be positioned on front surface 105 so that it substantially covers ambient input region 108. Filter 132, if present, can be used to completely block, or substantially reduce, radiation from scene 118 with the same wavelength as the ocular measurement wavelength so that it doesn't interfere with ocular measurement. The wavelength or wavelength range is filtered by filter 132 will depend on the wavelength used for ocular measurement, referred to herein as the ocular measurement wavelength. In an embodiment in which the wavelength used for ocular measurement is infrared, filter 132 can be a hot mirror or infrared filter, but in other embodiments filter 132 can be some other type of filter. In other embodiments, filters such as filter 132 could also be placed at other locations where ambient light could enter light guide 102, such as the top and bottom surfaces of the light guide. In embodiments that exclude filter 132, the ocular measurement radiation can be a very short visible pulse which can then be subtracted from background radiation of the same wavelength to obtain an image of eye 120.

An ocular measurement radiation source 134 is positioned adjacent to camera 124 to illuminate eye 120 so that it can be imaged by camera 124. Ocular measurement radiation source 134 can emit polarized or unpolarized radiation at the ocular measurement wavelength and is positioned and oriented to direct ocular measurement radiation through optical element 113 into light guide 102, which directs it to optical element 112, input/output optical element 140, and eye 120. In one embodiment radiation source 134 can be an infrared light-emitting diode (LED) so that the ocular measurement light has a wavelength in the infrared range, but in other embodiments radiation source 134 can emit a different wavelength, for example a visible wavelength.

One or more additional ocular measurement radiation sources 136 can also be positioned adjacent to camera 124. Like radiation source 134, the one or more sources 136 are positioned and oriented so it can direct polarized or unpolarized radiation at the ocular measurement wavelength through optical element 113 into light guide 102, which directs it to optical element 112, input/output optical element 140, and eye 120.

To be imperceptible to the user, the ocular measurement radiation from sources 134 and 136 can be a very short visible pulse, or can be a pulsed or continuous illumination using wavelengths not visible to the user, such as infrared wavelengths. In one embodiment, ocular measurement radiation sources 134 and 136 emit at center wavelengths of about 700 nm, which for most people is just beyond the limit of perception. But in other embodiments any wavelength in the range of 450 nm to 1100 nm can be used. If a non-silicon detector is used in camera 124, even longer wavelengths are possible.

FIGS. 1A-1B together illustrate operation of heads-up display 100. Three optical paths can operate simultaneously in display 100: the display light path, the ambient light path, and the ocular measurement radiation path. FIG. 1A shows the display and ambient light paths, FIG. 1B the ocular measurement radiation path. For illustration only a small number of exemplary rays are shown for each path, but many other rays also reach the eye. These rays are emitted over a range of angles, are scattered, and result in illumination of eye 120 at a plurality of angles of incidence.

The operation described below is of an embodiment in which proximal optical element 113 is a polarizing beamsplitter that (i) passes p-polarization and reflects s-polarization for visible light and (ii) passes both s-polarization and p-polarization for the ocular measurement radiation wavelength. Distal optical element 112 is similarly a polarizing beam splitter that passes p-polarization and reflects s-polarization for both visible light wavelengths and the ocular measurement wavelength. Of course, in other embodiments the optical characteristics of optical elements 112 and 113 can be selected differently.

The display light path begins at display light source 128, which generates visible p-polarized and infrared-free light. P-polarized light from light source 128 travels through polarizing beamsplitter 113 and strikes display 107. Display 107 reflects the incident light, changes it to s-polarization in active pixels to modulate an optical signal onto the light. The s-polarized display light is directed toward polarizing beam splitter 113, which reflects it such that the s-polarized display light encounters half-wave plate 127, which rotates the polarization of the display light so that it is p-polarized. The now p-polarized display light enters light guide 102 and travels through the light guide to polarizing beam splitter 112. As it travels through light guide 102, p-polarized display light encounters optical element 126, if present. Optical element 126 can apply optical power to the display light to either focus or collimate it. After passing through optical element 126, the display light continues to light guide 102 toward distal end 106, where it encounters polarizing beamsplitter 112.

When the p-polarized display light impinges on polarizing beamsplitter 112, the beamsplitter allows the p-polarized display light to travel directly through it. The p-polarized light that passes through beamsplitter 112 then travels through quarter-wave plate 116, which rotates the polarization by 45 degrees, and then encounters focusing mirror 114. Focusing mirror 114 reflects and/or focuses the polarized light, directing it back through quarter-wave plate 116. On its second trip through quarter-wave plate 116, the polarization of the display light is rotated by a further 45 degrees, so that before encountering polarizing beamsplitter 112 again the polarization of the display light has changed to s-polarization. As a result of this change of polarization, when the now s-polarized display light encounters polarizing beamsplitter 112 a second time the beamsplitter reflects the display light toward input/output region 110 instead of allowing it to pass through. The s-polarized display light then exits the light guide 102 and enters the user's eye 120.

The second optical path shown in FIG. 1A is the ambient light path. Simultaneously with receiving light from display 107, light guide 102 can receive ambient light from scene 118 through ambient input region 108. Filter 132, if present, covers some or all of ambient input region 108 and functions to reduce or eliminate radiation from the ambient light that is substantially of the same wavelength as the wavelength of the ocular measurement radiation, so that the ambient light will not interfere with the ocular measurement radiation. For example, in an embodiment where the ocular measurement radiation is infrared, filter 132, if present, reduces or eliminates infrared from the ambient light. After filtering by filter 132, a substantial portion of the ambient light that enters through ambient input region 108 can travel straight through polarizing beamsplitter 112 and exit the light guide through output region 110 to user's eye 120.

FIG. 1B shows the third optical path, which is the path of the ocular measurement radiation used to illuminate the iris and sclera of eye 120 for ocular measurement. Ocular measurement radiation sources 134 and 136 (if present) direct p-polarized ocular measurement radiation to user's eye 120 via optical elements 112, 113, 114, 116, and 140, along an optical path substantially similar to the display light. User's eye 120 reflects the s-polarized ocular measurement radiation and directs it into light guide 102 through input/output region 110. When the s-polarized ocular measurement radiation impinges on polarizing beamsplitter 112, the s-polarized radiation is reflected by the beamsplitter toward quarter-wave plate 116, which rotates the polarization by 45 degrees, and then encounters focusing mirror 114. Focusing mirror 114 reflects and/or focuses the polarized light, directing it back through quarter-wave plate 116. On its second trip through quarter-wave plate 116, the polarization of the ocular measurement radiation is rotated by a further 45 degrees, so that before encountering polarizing beamsplitter 112 again the polarization of the ocular measurement radiation has change to p-polarization. As a result of this change of polarization, when the now p-polarized display light encounters polarizing beamsplitter 112 a second time the beamsplitter allows the p-polarized ocular measurement radiation to travel directly through it into light guide 102 and toward beamsplitter 113.

When the p-polarized ocular measurement radiation encounters half-wave plate 127 it becomes s-polarized, but because beamsplitter 113 passes both p- and s-polarization in the ocular measurement wavelength, the s-polarized ocular measurement radiation travels straight through beamsplitter 113 to camera 124. Camera 124 can then use the received ocular measurement radiation to image user's eye 120. Optical elements 125 and 126, if present, can be used to adjust characteristics of the image received at camera 124, for example its field of view and/or its optical power.

Figure 1C:
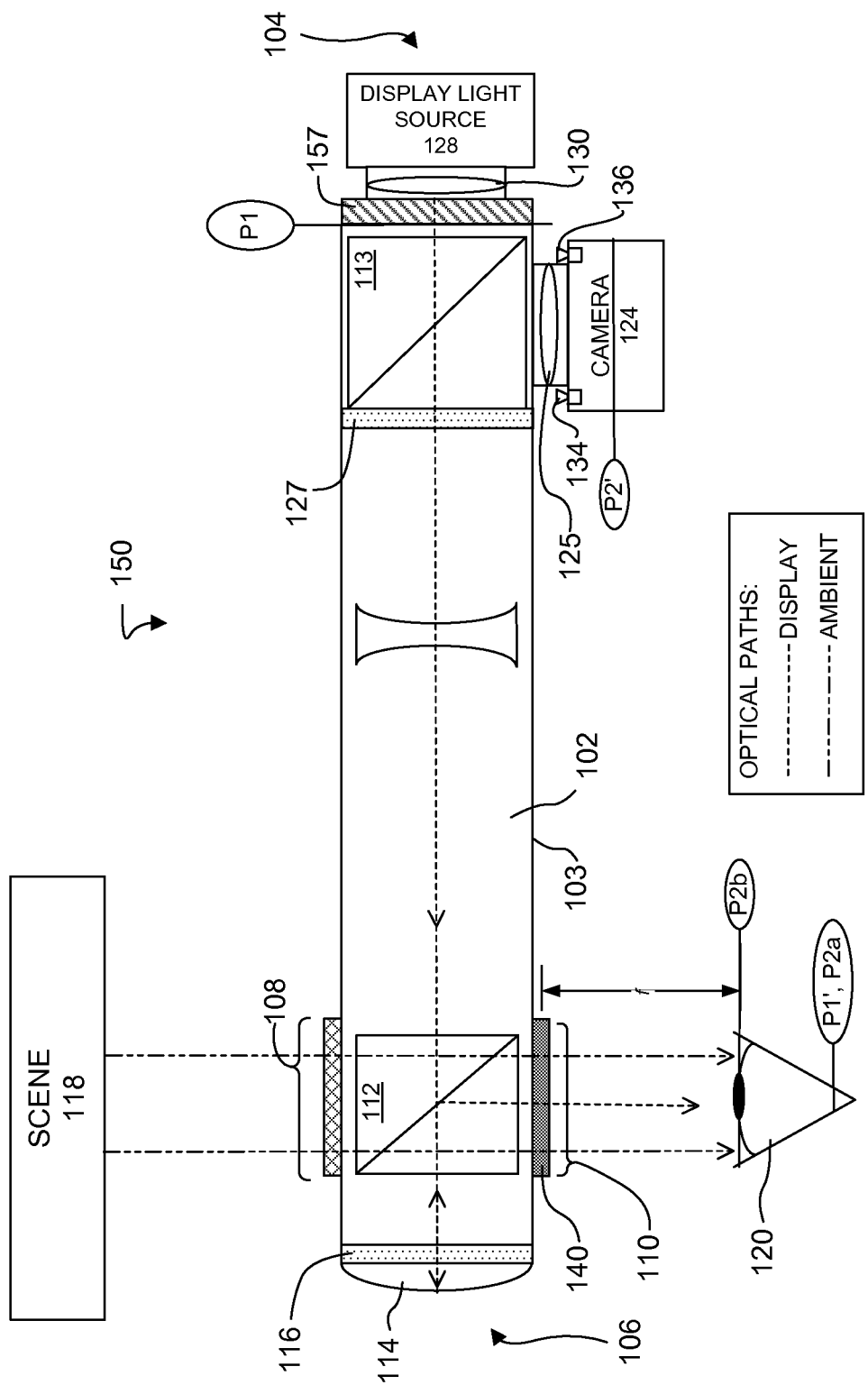
FIGS. 1C-1D are cross-sectional views of another embodiment of a heads-up display illustrating its construction (FIGS. 1C-1D), its display and ambient light paths (FIG. 1C) and its ocular measurement radiation path (FIG. 1D).
Figure 1D:
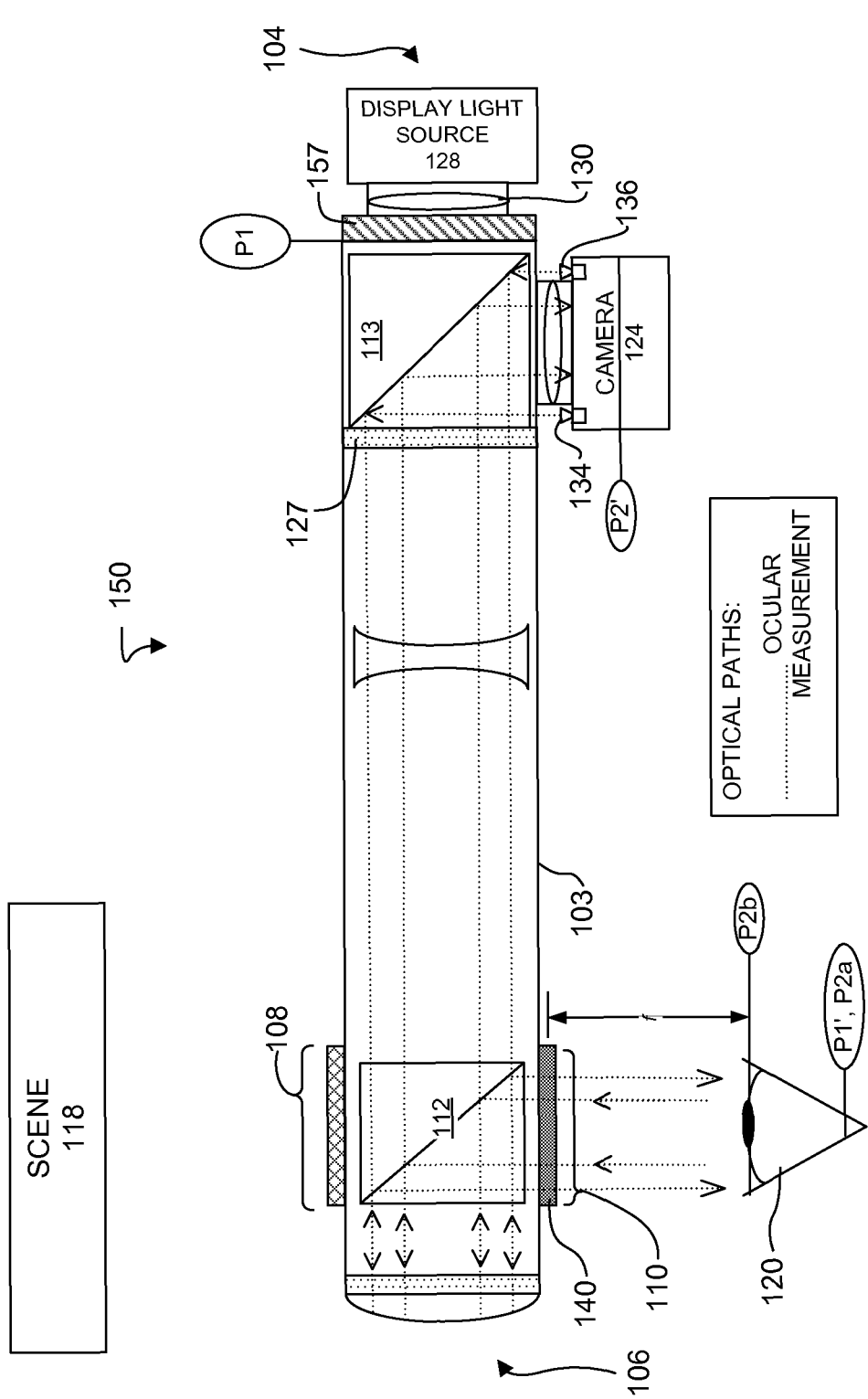

FIGS. 1C-1D illustrate another embodiment of a heads-up display 150. Display 150 is similar in construction to display 100. The primary difference between displays 150 and 100 is that display 150 uses a transmissive display 157 instead of a reflective display 107. As a result, display light source 128 is repositioned so that it directs light through display 157. In the illustrated embodiment the repositioning of display light source 128 also results in a repositioning of camera 124, but in other embodiments that camera 124 can remain as positioned in display 100 while only display light source 128 is repositioned to accommodate transmissive display 157. The three optical paths in display 150 are similar to those in display 100, except that the optical characteristics of optical elements within the display 150 might need to be adjusted to accommodate different positions of display light source 128, camera 124, or both.

Figure 1E:
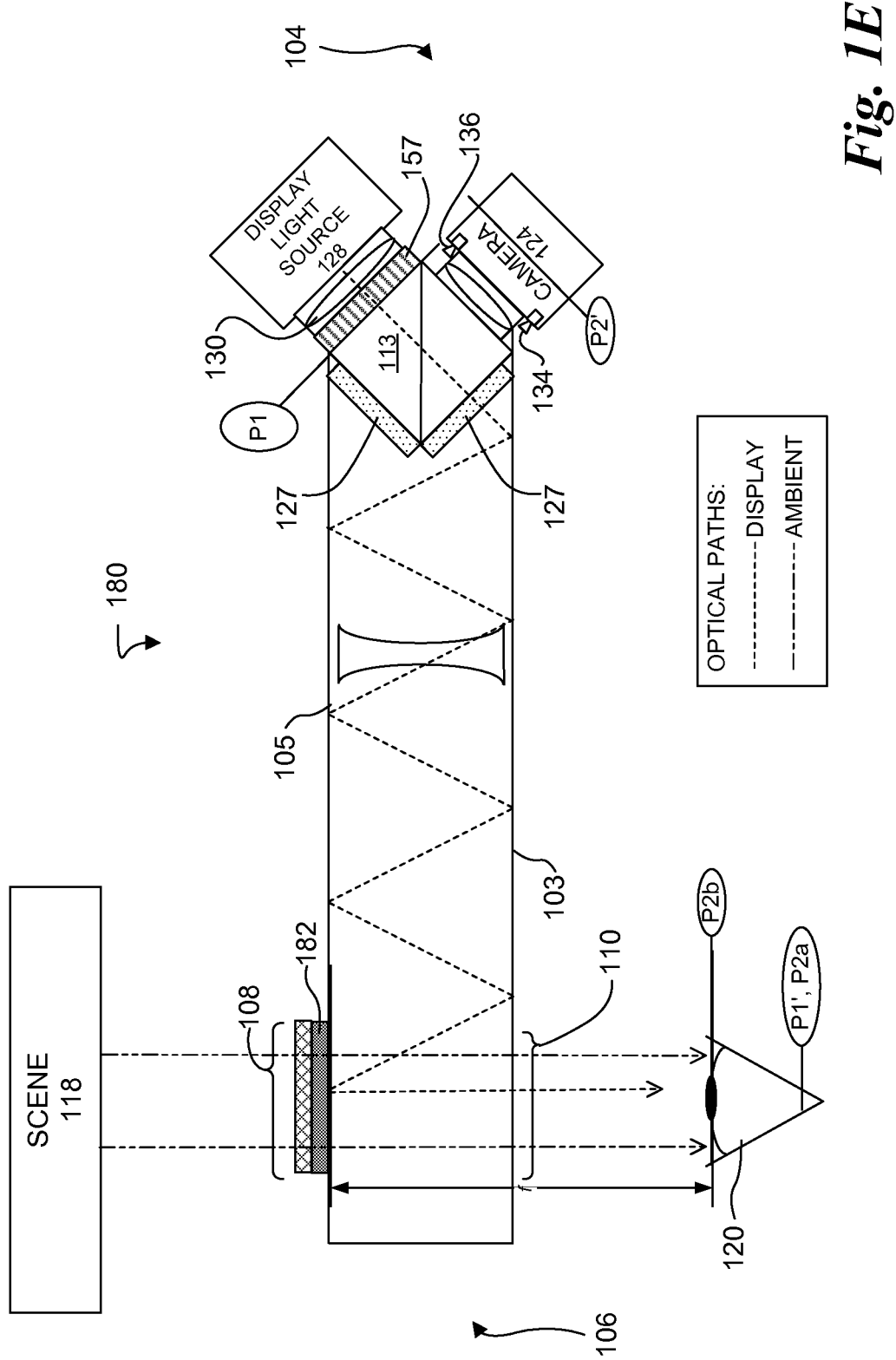
FIGS. 1E-1F are cross-sectional views of another embodiment of a heads-up display illustrating its construction (FIGS. 1E-1F), its display and ambient light paths (FIG. 1E) and its ocular measurement radiation path (FIG. 1F).
Figure 1F:
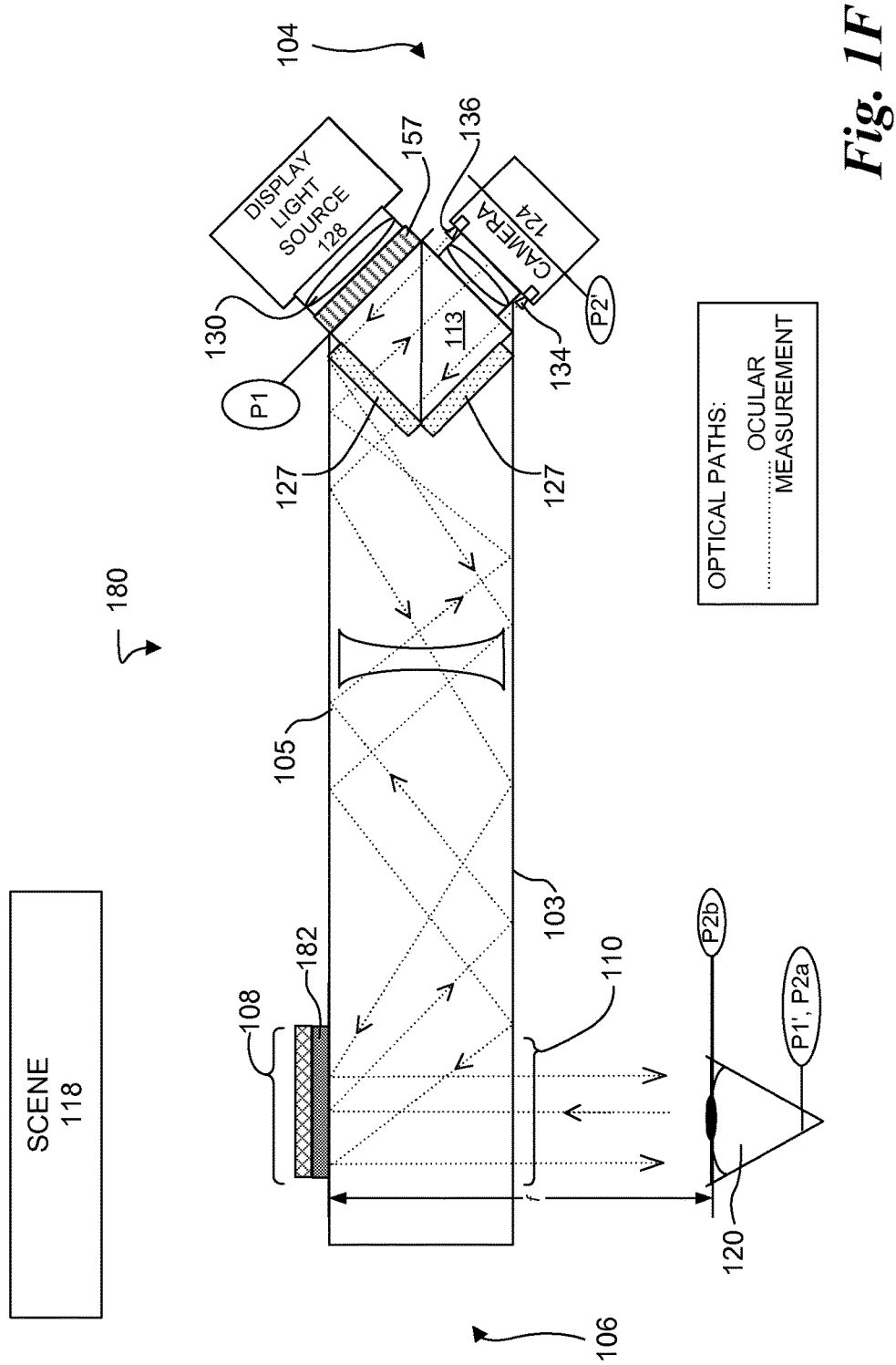

FIGS. 1E-1F illustrate another embodiment of a heads-up display 180. Display 180 is similar in construction to display 150. The primary difference between displays 150 and 180 is that display 180 uses a reflecting input/output optical element 182 instead of a transmitting optical element 140 shown for display 150. In one embodiment reflecting input/output optical element 182 can be a reflecting holographic optical element (HOE), but in other embodiments other types of reflecting optical elements can be used. In the illustrated embodiment reflecting input/output optical element 182 replaces optical element 112 and is positioned over ambient input region 108 on front surface 105 of light guide 102. Optical element 182 is optically coupled to at least input region 108, input/output region 110, and optical element 113.

The three simultaneous optical paths in display 180 are similar to those in other disclosed displays, but to use reflecting optical element 182 the illustrated rays use total internal reflection within light guide 102. The optical characteristics of other optical elements of display 180 might need to be adjusted to accommodate reflective optical element 182. For example, optical element 113, display light source 128, display 157, camera 154 and optical element 127 can be rotated by a selected angle to inject or receive the display light and ocular imaging radiation into light guide 102 at an angle so that they propagate through light guide 102 by total internal reflection. In the illustrated embodiment the selected angle is substantially 45 degrees, but a different angle could be selected in other embodiments. Other optical elements, such as optical elements 114 and 116, can be omitted in this embodiment. Analogous modifications can be made in displays 100, 150, 200, and 300.

Figure 2:
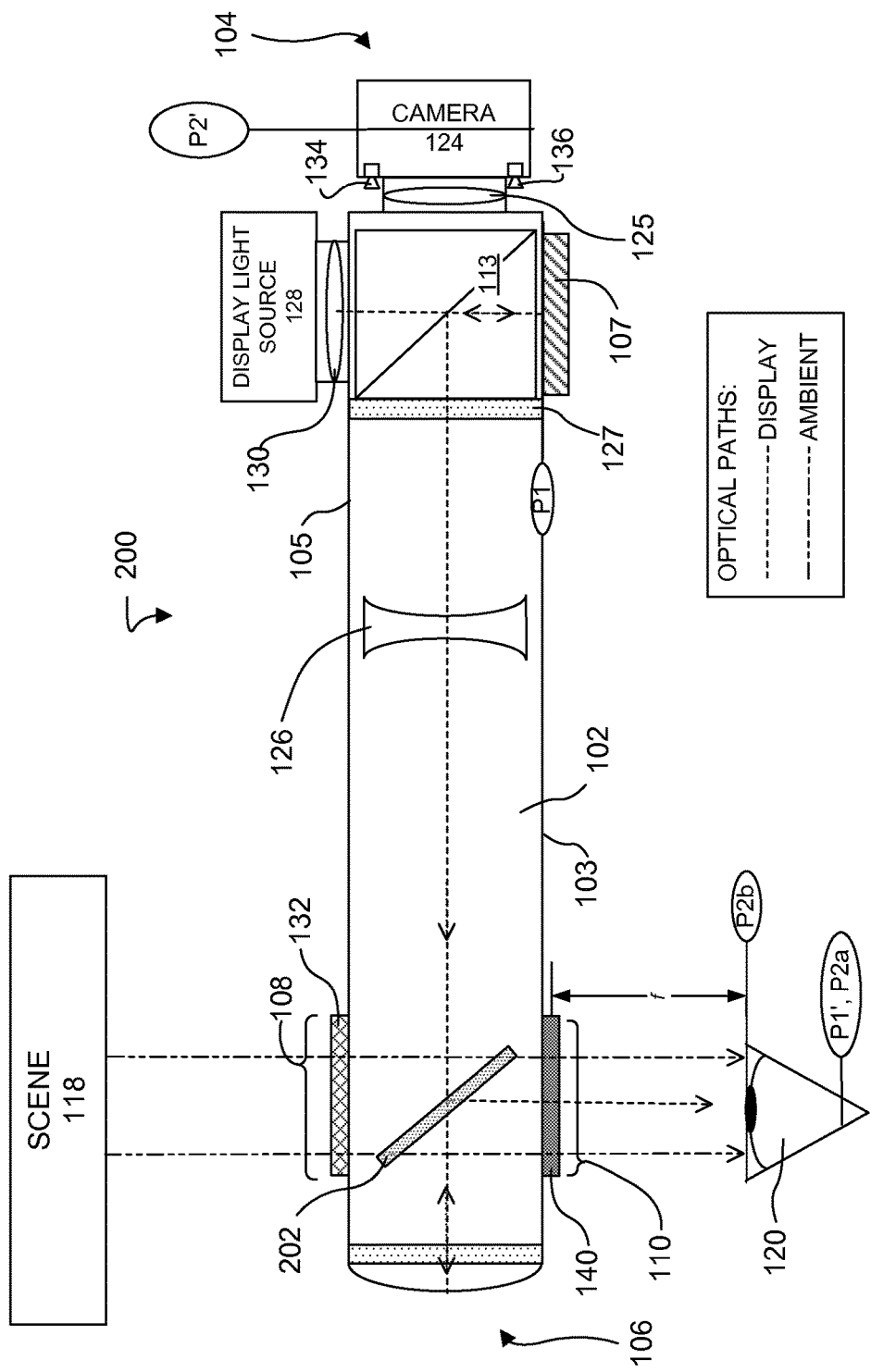
FIG. 2 is a cross-sectional view of another embodiment of a heads-up display.

FIG. 2 illustrates another embodiment of a heads-up display 200. Display 200 is similar in construction to display 100. The primary difference between displays 100 and 200 is that display 200 uses a partially-reflective mirror 202 for distal optical element 112; in other words, display 200 replaces polarizing beam splitter 112 of display 100 with partially-reflective mirror 202. In one embodiment partially-reflective mirror 302 is 50% reflective, meaning that is reflects 50% of the incident light and allows the other 50% of the incident light to pass through. In other embodiments, however, these percentages can be different. The three optical paths in display 200 are similar to those in display 100, except that at partially-reflective mirror 202 there is no selective passing and reflection of the different optical paths based on polarization.

Figure 3:
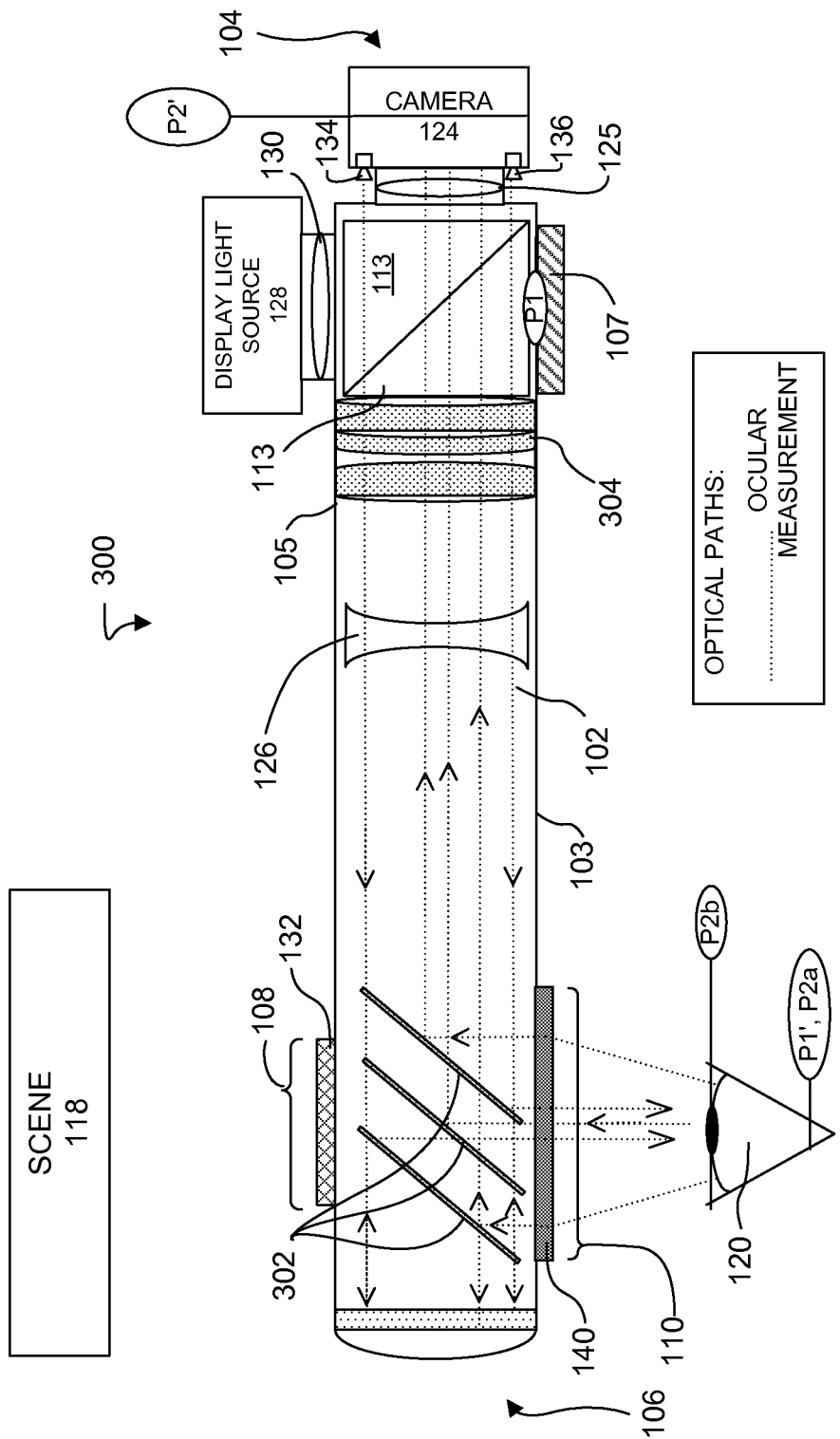
FIG. 3 is a cross-sectional view of another embodiment of a heads-up display.

FIG. 3 illustrates another embodiment of a heads-up display 300. Display 300 is similar in construction to display 100; the primary differences are that display 300 replaces distal optical element 112 with an optical element having a plurality of semi-transparent reflectors 302, and that display 300 includes a lens system 304 that conditions light entering and leaving light guide 102. In the illustrated embodiment lens system 304 includes a plurality of individual refractive lenses, but in other embodiments it could include more or less elements, can include reflective or diffractive elements, or can be composed of reflective elements or diffractive elements.

Display 300 operates similarly to display 100. As with display 100, display 300 includes three simultaneous optical paths: the display light path, the ambient light path, and the ocular measurement radiation path. Only the ocular measurement path is shown in the figure, but the display light path and the ambient light path are substantially similar to the corresponding light paths in display 100. Display 300 illustrates how ocular measurement can be integrated in systems with multiple pupils that are combined to form a large pupil. A collimating lens system 304 can be used to produce an image at infinity, or at least at a great distance, so that rays produced at a single point on display 107 are parallel (collimated). The rays propagate through light guide 102 to a plurality of semi-transparent reflectors 302 that relay light to the eye. Light guide 102 might or might not use total internal reflection from its boundaries. Eye 120 can be illuminated as previously described. As shown in FIG. 3, light reflected by eye 120 is collected by HOE 140, which has a focal length approximately equal to the eye relief distance f. Accordingly, rays 250 are collimated and return along optical paths in light guide 102 and through optical system 304, which focuses the ocular measurement radiation onto the image sensor in camera 124.

The illustrated embodiments can be further understood by using the concept of conjugate optical planes; the description below is of heads-up display 300, but the explanation applies to all disclosed embodiments. An optical plane P has a conjugate optical plane P' if points substantially on plane P are imaged at plane P'. For display purposes—that is, for presentation of images from display 107 to eye 120—display 107 forms an optical plane P1 and the retina of eye 120 constitutes its conjugate optical plane P1'. But for ocular measurement there can be more than one pair of conjugate optical planes. For visible light unaffected by HOE 140, the image sensor within camera 124 forms an optical plane P2' which, when placed at the same distance from collimator 220 as display 107, also has a conjugate optical plane P2a formed by the retina of eye 120. If the optical element 113 is designed to reflect a portion of the visible light returning from the retina, the image sensor can then detect an image of the retina and the image formed on it. This can be useful for system inferences of what the user is viewing. For the ocular measurement wavelength, HOE 140 modifies the location of one of the image planes to the surface of the eye, forming a new pair of conjugate optical planes in which optical plane P2b is at the surface of the eye and its conjugate optical plane is the same image plane P2' at the image sensor within camera 124. Thus, for the ocular measurement radiation, an image of the eye surface is formed on the sensor.

Camera 124 can be configured to detect both visible and infrared images. CMOS image sensors are typically patterned with red green and blue filters to detect a color image. But the color filters can be replaced with a visible and infrared filter pattern, so that a pixel and its neighboring pixel detect visible light at the first pixel and infrared at the neighboring pixel. In this way both visible and infrared patterns are detected, meaning that images of the retina and eye surface are both captured simultaneously.

Detection of images from the retina requires that optical element 113 transmit at least one wavelength that is unaffected by HOE 140. These wavelengths can be visible or infrared, but excluding the selected ocular measurement wavelength. Sunlight and most environmental lighting includes infrared radiation. Although the user cannot see near infrared, a reflected image of the ambient scene may be collected from the retina, for example between 700 and 720 nm (a barely perceptible red). This wavelength range is not important for display purposes, so beam splitter 113 can be configured to reflect wavelengths longer than 670 nm and in this way sensor 210 can collect images from the retina. The CMOS filter intended for retinal imaging can be specifically designed to reject the design wavelength of HOE 140 so that retinal and eye surface images are separated. Alternatively, if beam splitter 113 is a polarization beam splitter operative in the visible wavelengths, light returned from the retina may be passed to the sensor to form a visible image.

Figure 4A:
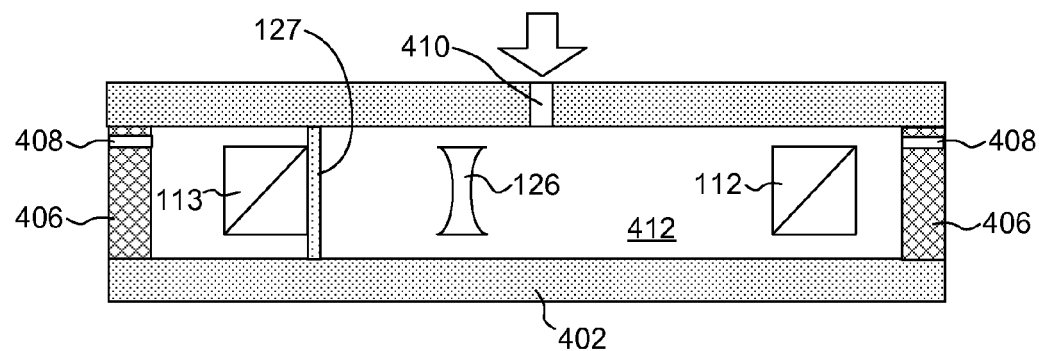
FIGS. 4A-4B are cross-sectional drawings of an embodiment of a process for making a heads-up display such as the one shown in FIGS. 1A-1B.
Figure 4B:
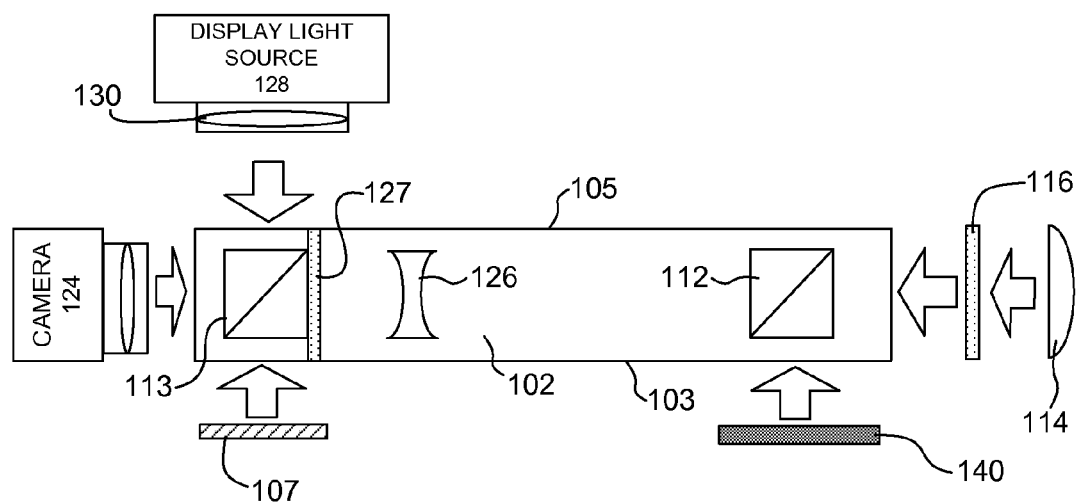

FIGS. 4A-4B illustrate an embodiment of a process for making heads-up display 100, but the illustrated process can also be used for making the other disclosed displays. FIG. 4A illustrates a first part of the process, in which a mold is formed using a lower plate 402 and an upper plate 404 separated by one or more spacers 406. The mold encloses a volume 412. Top plate 404 has a hole 410 therein to allow material to be injected into volume 412, while spacers 406 have vent holes 408 to allow gas to escape from volume 412 while material is injected through hole 410.

Optical elements that will be internal to the waveguide, such as half-wave plate 127, distal optical element 112 and proximal optical element 113, and additional optical element 126, if present, are properly positioned within volume 412 and fixed so that they do not move. A material is then injected through hole 410 into volume 412 so that it surrounds the internal optical elements, and the material is allowed to cure. When cured, the injected material will form light guide 102 and will hold the internal optical elements in place. Any material that has the required optical characteristics can be used; in one embodiment, for example, the material can be an optically transparent plastic such as polycarbonate or an optical-grade acrylic, but in other embodiments it can be a different material.

FIG. 4B illustrates a next part of the process. After the material is cured inside the mold the mold can be removed, leaving behind light guide 102. Elements of the display that go on the exterior of the light guide can then be added to complete the display. For example, camera 124 and optical element 125 (if present) can be attached to the proximal end of light guide 102; display light source 128 and optical element 130 (if present) can be attached to front side 105; display 107 and input/output optical element 140 can be attached to back side 103; and quarter-wave plate 116 and optical element 114 can be attached to the distal end of light guide 102. In one embodiment, all the components that go on the exterior of the light guide 102 can be attached using optically compatible adhesives that will hold these components in place while causing little or no optical distortion.

Figure 5:
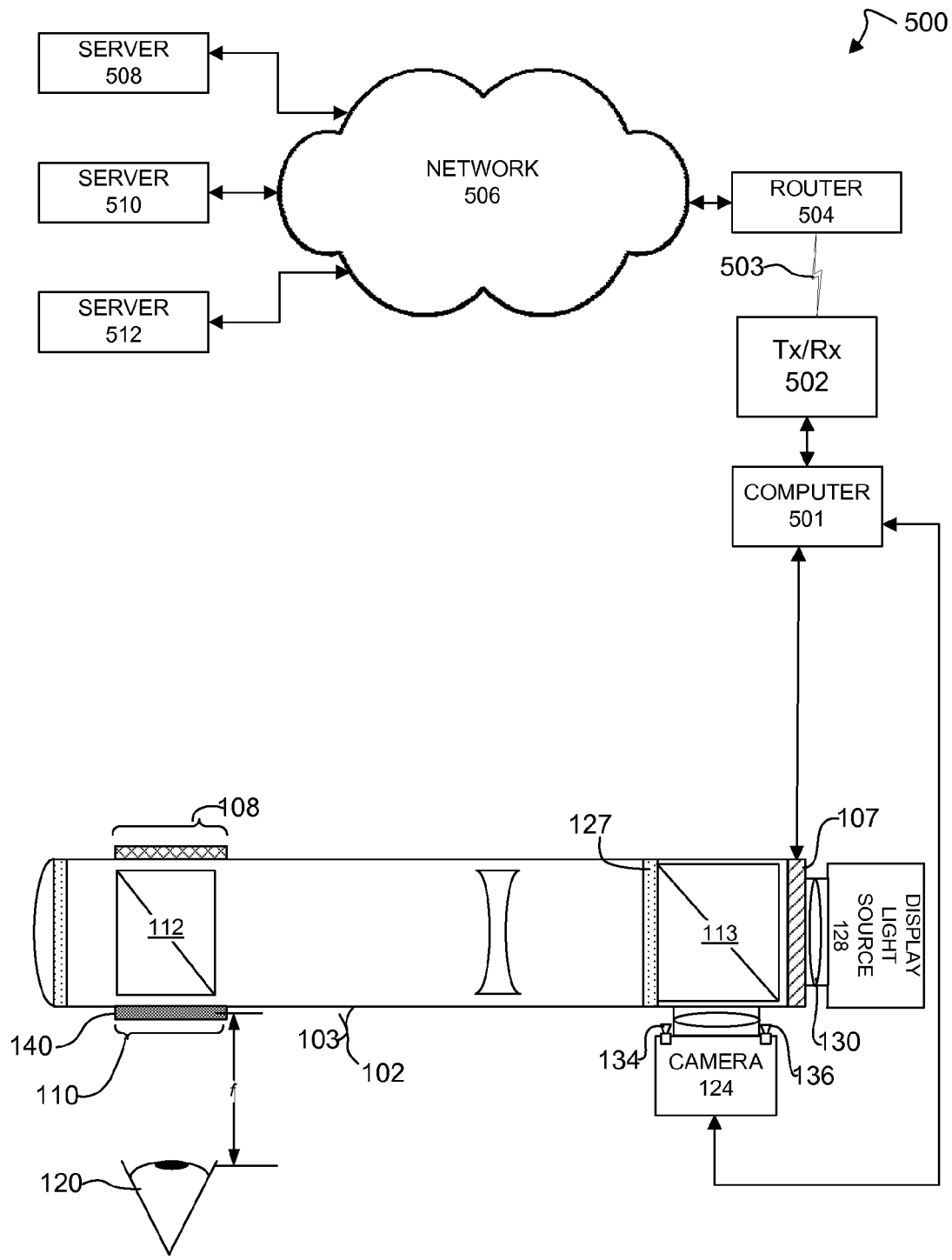
FIG. 5 is a block diagram of an embodiment of a system using a heads-up display such as the one of FIGS. 1A-1B.

FIG. 5 illustrates an embodiment of a system 500 including a heads-up display. System 500 employs display 100 as one of its components, but in other embodiments system 500 can employ any of the other disclosed displays. In some embodiments of system 500 the display, whether display 100 or one of the other disclosed displays, can include a secondary camera (not shown) positioned in, on or near the display to capture an image of scene 118. In system 500, camera 124 and display 107 are communicatively coupled via a computer 501 to a transceiver 502 that can both receive (Rx) and transmit (Tx) data. Computer 501 can include a general-purpose processor or an application-specific processor (ASIC), as well as memory, storage and any software or programming needed for its operation, such as an operating system, applications, databases and so forth. Computer 501 can also include additional hardware, such as a GPS unit that will provide the user's location.

Transceiver 502 is coupled to computer 501 as well as being coupled via a communication link 503 to a communication element such as a router 504; in the illustrated embodiment transceiver 502 and router 503 are coupled via a wireless link, but in other embodiments they could be coupled by other types of communication link such as electrical wire, optical fiber, free-space optics, etc. Router 504 is in turn coupled via a network 506 to one or more servers such as servers 508-512, but in other embodiments router 504 could be directly coupled to one or more servers without the need for an intervening network.

In operation of system 500, display 100 functions as previously described; user's eye 120 simultaneously sees ambient light from scene 118 and display light from display 107 while camera 124 simultaneously captures images of the user's eye 120. As the user sees ambient light from scene 118, camera 124 captures one or more images of user's eye 120 and transmits the images to computer 501. Computer 501 can then analyze the images and use the information to determine the focus of the user's gaze. In an embodiment with a secondary camera that captures an image of scene 118, computer 501 can use the ocular measurement data and scene images to tell what part of scene 118 the user is focused on, and can use the additional data, such as the user's location established via GPS, for example, to provide information to the user about the part of the scene they are looking at.

In one embodiment of system 500, all processing can be done locally by computer 501, while in another embodiment some or all the image processing, data retrieval, etc., can be done remotely by servers 508-512. In yet another embodiment, the data processing can be done by some combination of computer 501 and servers 508-512. In an embodiment where all processing is done locally by computer 501, the computer need not have any access to external computers, so that all image analysis, data retrieval, etc. is done locally by computer 501. Such an embodiment could reduce latency and enhance system response by reducing the need for network communication with other components. Computer 501 can analyze images received from camera 124 to determine the focus of the user's gaze. In an embodiment with a secondary camera that captures images of scene 118, computer 501 can use the ocular measurement data together with images of scene 118 to tell what part of the scene the user is focused on. Computer 501 can also use additional data, such as the user's location established via GPS, for example, to determine information about the part of the scene the user is looking at. Having determined relevant information about the scene, computer 501 can send the relevant information back to display 107. Display 107 then displays the relevant information about the object the user is viewing. Because display 100 is a heads-up display, the user's eye 120 sees the relevant information overlaid onto scene 118.

In an embodiment in which all processing is done remotely, or in an embodiment in which processing is done with a combination of local and remote processing, computer 501 can transmit all or parts of the image data to transceiver 502. Transceiver 502 in turn transmits the image data via communication link 503 to router 504, and the router in turn transmits the image data via network 506, if present, to one or more servers 508-512, which then can perform all the relevant image processing, data retrieval, etc.

Having processed the image data and determined any relevant information, servers 508-512 send the relevant information back through network 506, router 504 and transceiver 502 to computer 501 and display 107. Display 107 then displays the relevant information about the scene 118 to the user. Because display 100 is a heads-up display, the user's eye 120 sees the relevant information overlaid onto scene 118.

Figure 6:
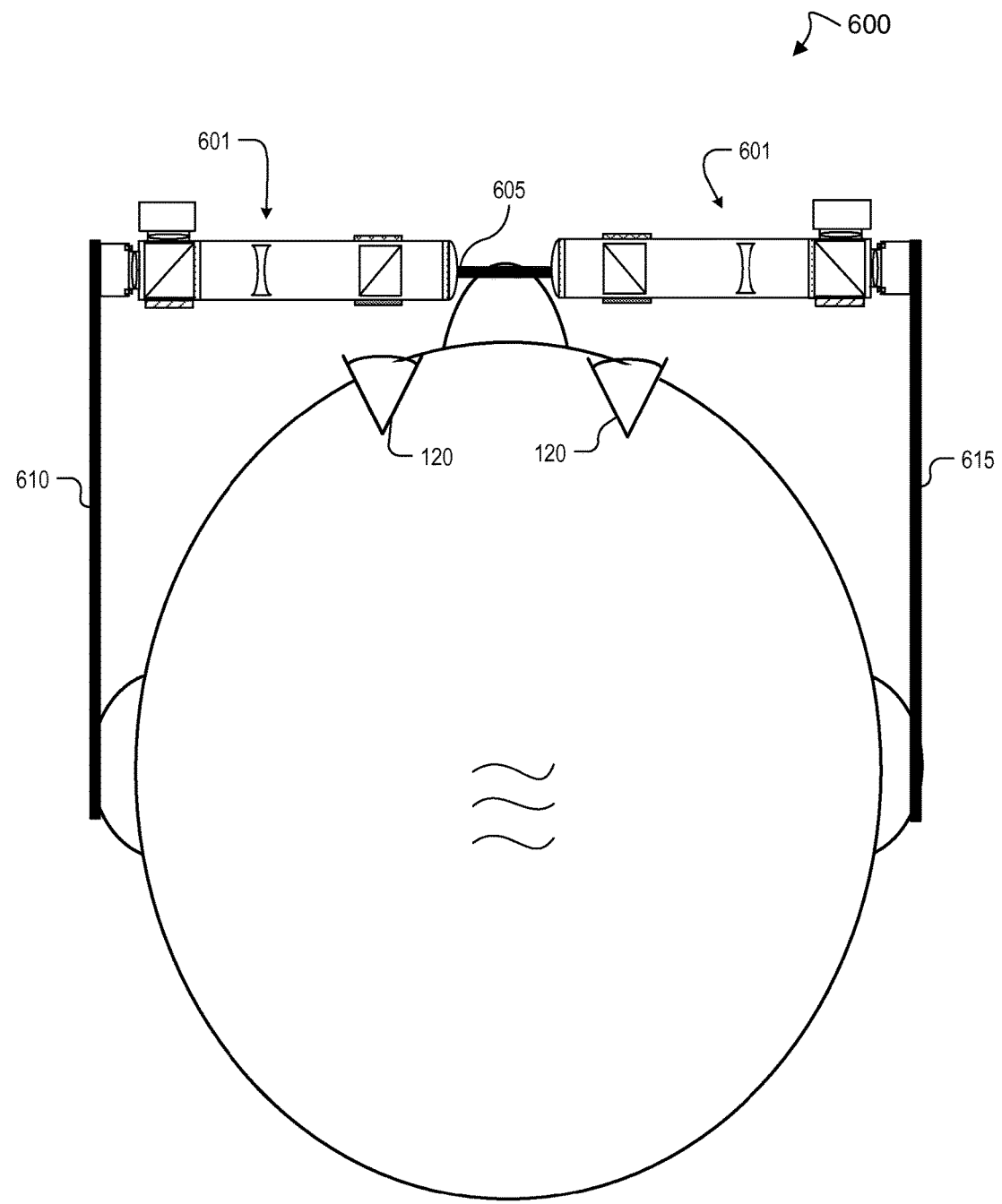
FIG. 6 is a top-view cross-sectional drawing of an embodiment of a heads-up display.

FIG. 6 illustrates an embodiment of a heads-up display 600 implemented as a pair of eyeglasses in which the eyeglass lens functions as the light guide. Heads-up display 600 includes a pair of eyepieces 601, each of which can be one of heads-up displays 100, 200 or 300, or can be all or part of a system such as system 500. Eyepieces 601 are mounted to a frame assembly, which includes a nose bridge 605, a left ear arm 610, and a right ear arm 615. Although the figure illustrates a binocular embodiment (two eyepieces), heads-up display 600 can also be implemented as a monocular (one eyepiece) embodiment.

Eyepieces 601 are secured into an eyeglass arrangement that can be worn on a user's head. Left and right ear arms 610 and 615 rest over the user's ears while nose assembly 605 rests over the user's nose. The frame assembly is shaped and sized to position the ambient input region 108 and input/output region 110 in front of a corresponding eye 120 of the user. Of course, other frame assemblies having other shapes may be used (e.g., a visor with ear arms and a nose bridge support, a single contiguous headset member, a headband, or goggles type eyewear, etc).

Ocular measurement can be integrated in monocular or binocular vision systems and can be used to determine the horizontal and vertical angle associated with the user's gaze. In binocular systems where left and right eyes are independently and accurately measured and the focus of their gaze determined, a determination of the user's eye convergence angle and distance to the object of interest can be made. For example, each ocular measurement can determine the direction of the user's gaze, represented by a vector from the user's eye to an object. If the object is at infinity, the vectors from the left and right eyes will be parallel; however, if the user is gazing at a near object, the vectors will converge on the object. Since the inter-pupillary distance of the user can be measured, the angles of the left and right gaze vectors can be used to determine the distance to the object. A single camera, or separate right and left cameras, can be combined with the ocular measurements to determine the specific object that the user is gazing at. Camera 124 has a field of view (FOV) expressed as a vertical FOV angle and a horizontal FOV angle, meaning that each pixel in the camera is associated with a horizontal and vertical angle within the FOV. By combining the gaze angle determination from the ocular measurement with the image data, the object of interest can be determined. The use of two cameras makes possible the use of parallax differences for an independent determination of distance that can be used to improve accuracy.

Ocular measurement is improved if the image of the eye is obtained using a camera perspective that is largely in front of the eye, meaning that images of the pupil and iris are nearly undistorted (e.g., round). An undistorted image of the eye enables a more accurate calculation of eye position, user identification and health monitoring. Ordinarily the camera must be mounted away from the display optics so as not to interfere with the user's view of the display, and this generally results in a distorted image of the eye, which is a limitation of prior art ocular measurement systems that are combined with display systems. But if ocular measurement is integrated with the display optics, the camera's view of the eye can be placed in the optimum position for a largely undistorted image. Moreover, integration of the ocular measurement system with existing display optics greatly reduces system complexity and allows the camera to be co-located with the display, leading to a more compact design with lower weight, size, and cost. Minimizing weight, size and cost is highly desirable in wearable systems, where these parameters are highly restricted.

The operation of the computer system may also be improved if an image of the retina of eye 120 can be recorded. Such an image would allow inferences about what the user's vision is focused on (it may be the system display or a feature of an ambient scene).

In situations in which the systems discussed here collect personal information about users, or may make use of personal information, the users can be given an opportunity to control whether programs or features collect user information (e.g., information about a user's social network, social actions or activities, profession, a user's preferences, or a user's current location), or to control whether and/or how to receive content from the content server that may be more relevant to the user. In addition, certain data can be treated in one or more ways before it is stored or used so that personally identifiable information is removed. For instance, a user's identity can be treated so that no personally identifiable information can be determined for the user, or a user's geographic location may be generalized where location information is obtained (such as to a city, ZIP code, or state level), so that a particular location of a user cannot be determined. Thus, the user may how control over how information about the user is collected and used by a content server.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification. Rather, the scope of the invention should be determined entirely by the following claims, which are to be interpreted according to established doctrines of claim interpretation.

The invention claimed is:

1. An apparatus comprising:
  a light guide including a proximal end, a distal end, a front surface and a back surface spaced apart from the front surface, an ambient input region on the front surface near the distal end, and an input/output region on the back surface near the distal end;
  a display positioned near the proximal end;
  a camera positioned at or near the proximal end to image ocular measurement radiation;
  a proximal optical element positioned in the light guide near the proximal end and a distal optical element positioned in the light guide near the distal end,
  wherein the proximal optical element is optically coupled to the display, the camera and the distal optical element such that it directs display light to the distal optical element and directs ocular measurement radiation received from the distal optical element to the camera, and
  wherein the distal optical element is optically coupled to the proximal optical element, the ambient input region and the input/output region such that it directs display light and ocular measurement radiation to the input/ output region and directs ocular measurement radiation from the input/output region to the proximal optical element; and an input/output optical element positioned on the back surface over the input/output region and optically coupled to the input/output region, wherein the input/output region and the input/output optical element output display light, ambient light, and ocular measurement radiation from the light guide and input ocular measurement radiation to the light guide, wherein the display light and the ambient light are in a visible range of wavelengths and the ocular measurement radiation is in an invisible range of wavelengths, and wherein the input/output optical element applies optical power to the ocular measurement radiation and applies substantially no optical power to the display light and the ambient light.

2. The apparatus of claim 1 wherein the proximal optical element and the distal optical elements are polarizing beamsplitters.

3. The apparatus of claim 2, further comprising:
a focusing element positioned at the distal end of the light guide; and
a quarter-wave plate positioned between the focusing element and the distal end of the light guide.

4. The apparatus of claim 1 wherein the proximal optical element is a polarizing beamsplitter and the distal optical element is a polarizing plate.

5. The apparatus of claim 1, further comprising one or more ocular measurement radiation sources positioned adjacent to the camera.

6. The apparatus of claim 5 wherein the one or more ocular measurement radiation sources are light-emitting diodes.

7. The apparatus of claim 6 wherein the one or more ocular measurement radiation sources comprise a plurality of sources, each source having a different center wavelength within the wavelength range of the ocular measurement radiation.

8. The apparatus of claim 1 wherein the ocular measurement radiation is infrared.

9. The apparatus of claim 1 wherein the ocular measurement radiation is of variable wavelength.

10. The apparatus of claim 9 wherein the optical power of the input/output optical element varies according to the wavelength of the ocular measurement radiation.

11. The apparatus of claim 9 wherein the input/output optical element is a reflection holographic optical element (HOE).

12. The apparatus of claim 10 wherein the input/output optical element is a transmission holographic optical element (HOE).

13. The apparatus of claim 12 wherein the HOE operates as a positive focal length lens over the wavelength range of the ocular measurement radiation.

14. A system comprising:
one or more displays, each display comprising:
a light guide including a proximal end, a distal end, a front surface, a back surface spaced apart from the front surface, an ambient input region on the front surface near the distal end, and an input/output region on the back surface near the distal end;
a display positioned near the proximal end;
a camera positioned at or near the proximal end to image ocular measurement radiation;
a proximal optical element positioned in the light guide near the proximal end and a distal optical element positioned in the light guide near the distal end,
wherein the proximal optical element is optically coupled to the display, the camera and the distal optical element such that it directs display light to the distal optical element and directs ocular measurement radiation received from the distal optical element to the camera,
wherein the distal optical element is optically coupled to the proximal optical element, the ambient input region and the input/output region such that it directs display light and ocular measurement radiation to the input/output region and directs ocular measurement radiation from the input/output region to the proximal optical element, and
an input/output optical element positioned on the back surface over the input/output region and optically coupled to the input/output region, wherein the input/output region and the input/output optical element output display light, ambient light, and ocular measurement radiation from the light guide and input ocular measurement radiation to the light guide, wherein the display light and the ambient light are in a visible range of wavelengths and the ocular measurement radiation is in an invisible range of wavelengths, and wherein the input/output optical element applies optical power to the ocular measurement radiation and applies substantially no optical power to the display light and the ambient light; and
a computer coupled to the camera and the display.

15. The system of claim 14 wherein the proximal optical element and the distal optical elements are polarizing beamsplitters.

16. The system of claim 15, further comprising:
a focusing element positioned at the distal end of the light guide; and
a quarter-wave plate positioned between the focusing element and the distal end of the light guide.

17. The system of claim 14 wherein the proximal optical element is a polarizing beamsplitter and the distal optical element is a polarizing plate.

18. The system of claim 14, further comprising one or more ocular measurement radiation sources positioned adjacent to the camera.

19. The system of claim 18 wherein the one or more ocular measurement radiation sources are light-emitting diodes.

20. The system of claim 19 wherein the one or more ocular measurement radiation sources comprise a plurality of sources, each source having a different center wavelength within the wavelength range of the ocular measurement radiation.

21. The system of claim 14 wherein the ocular measurement radiation is infrared.

22. The system of claim 14 wherein the ocular measurement radiation is of variable wavelength.

23. The system of claim 22 wherein the optical power of the input/output optical element varies according to the wavelength of the ocular measurement radiation.

24. The system of claim 23 wherein the input/output optical element is a holographic optical element (HOE).

25. The system of claim 23 wherein the input/output optical element is a reflection holographic optical element (HOE).

26. The system of claim 24 wherein the HOE operates as a positive focal length lens over the wavelength range of the ocular measurement radiation.

27. The system of claim 14, further comprising a network communicatively coupled to the computer.

28. The system of claim 27, further comprising one or more servers coupled to the network.

29. The system of claim 28 wherein the one or more servers can analyze images receive from the camera and can transmit information about the eye position to the computer.

30. The system of claim 14 wherein the one or more displays are mounted in a pair of eyeglass frames.

* * * * *